(12) United States Patent
Piccoli et al.

(10) Patent No.: US 7,129,843 B2
(45) Date of Patent: Oct. 31, 2006

(54) LC RESONANT CIRCUIT WITH AMPLIFICATION DEVICE

(75) Inventors: Anthony F. Piccoli, Audubon, NJ (US); Lawrence Appalucci, Villanova, PA (US); David Lopez Perez, Ponce, PR (US); Luis Francisco SolerBonnin, Guanica, PR (US); Gary T. Mazoki, Sewell, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 113 days.

(21) Appl. No.: 10/836,837

(22) Filed: Apr. 30, 2004

(65) Prior Publication Data

US 2005/0012615 A1    Jan. 20, 2005

Related U.S. Application Data

(60) Provisional application No. 60/467,210, filed on May 1, 2003.

(51) Int. Cl.
*G08B 13/14* (2006.01)
(52) U.S. Cl. .................. 340/572.1; 342/21; 340/572.7; 340/572.8
(58) Field of Classification Search .. 340/572.1–572.8; 343/755, 779, 833–842; 342/51, 42
See application file for complete search history.

(56) References Cited

U.S. PATENT DOCUMENTS

| | | | | |
|---|---|---|---|---|
| 4,021,705 A | * | 5/1977 | Lichtblau | 361/765 |
| 4,583,099 A | * | 4/1986 | Reilly et al. | 343/895 |
| 5,510,769 A | * | 4/1996 | Kajfez et al. | 340/572.5 |
| 6,320,509 B1 | * | 11/2001 | Brady et al. | 340/572.7 |
| 2004/0074974 A1 | * | 4/2004 | Senba et al. | 235/492 |
| 2004/0183742 A1 | * | 9/2004 | Goff et al. | 343/867 |

FOREIGN PATENT DOCUMENTS

| | | |
|---|---|---|
| EP | 0 794 520 A | 9/1997 |
| EP | 1 347 533 A | 9/2003 |
| WO | WO 0250951 A | 6/2002 |

OTHER PUBLICATIONS

Etsuo, EPO Patent Abstract of Japan, JP 2003 249813, vol. 2003, No. 12 (Sep. 5, 2003).
Shinichi, EPO Patent Abstract of Japan, JP 10 145267, vol. 1998, No. 10 (May 29, 1998).

* cited by examiner

*Primary Examiner*—Jeffery Hofsass
*Assistant Examiner*—Hoi C. Lau
(74) *Attorney, Agent, or Firm*—Caesar, Rivise, Bernstein, Cohen & Pokotilow, Ltd.

(57) ABSTRACT

A security tag includes a combination of a resonant frequency circuit with an adjacent amplification shield for enhancing output signal amplitude. The amplification shield is located adjacent to the resonant frequency circuit and is preferably in the same or substantially the same plane as the resonant frequency circuit or is in a close, generally parallel plane. In an exemplary embodiment, the resonant frequency circuit includes an inductor electrically coupled to a capacitor. The resonant frequency circuit has a center frequency and is arranged to resonate in response to exposure to electromagnetic energy at or near the center frequency, providing an output signal having an amplitude. The amplification shield is arranged to direct a portion of the electromagnetic energy to the resonant frequency circuit to amplify the amplitude of the output signal from the resonant frequency circuit.

22 Claims, 8 Drawing Sheets

LC RESONANT CIRCUIT WITH AMPLIFICATION DEVICE

FIELD OF THE INVENTION

This invention relates generally to passive security tags detectable by identification and security systems and more particularly to a resonant circuit responsive with an output signal enhanced for improved performance.

BACKGROUND OF THE INVENTION

The use of inductor capacitor (LC) resonant frequency circuits is well known for applications which include electronic article surveillance (EAS), chip based radio frequency identification (RFID), chipless RFID and other such applications. In such applications there are three key circuit parameters, which are typically employed for quantifying the electrical performance of the circuit, and, in particular, the antenna portion of the circuit. The three parameters are (1) the center frequency of the resonant circuit, (2) the quality factor (Q factor) of the resonant circuit, and (3) the relative output signal amplitude of the resonant circuit. With such circuits, the bandwidth is defined as the difference between an upper frequency and a lower frequency (F2) of the circuit at which the output amplitude response is 3 dB below the passband response. The output signal amplitude is a measured height of response of the circuit based on a fixed position and a fixed incident magnetic field strength. The quality or Q factor is the ratio of the center frequency of the resonant circuit divided by the bandwidth output signal of the circuit.

LC resonant frequency circuits are well known in the art. When used for EAS, such circuits are formed into labels or tags which are applied to goods to be protected. As an example, a tag may be formed of a dielectric substrate having first and second generally parallel planar surfaces on opposite sides thereof. A first side of the substrate includes a first conductive pattern in the form of a coil (forming the inductor of the circuit), a first end of which terminates in a generally square or rectangular plate forming a first electrode of the capacitor portion of the circuit. The second surface of the substrate includes a second generally square or rectangular plate forming the second electrode of the capacitor portion of the circuit and a conductive trace extending away from the capacitor plate to a point proximate an edge of the substrate. The distal end of the conductive trace is electrically connected by a weld through or around the edge of the substrate to the second end of the coil to thereby complete the parallel LC circuit. When a tag of this type is exposed to electromagnetic energy at or near the center frequency of the tag, as determined by the values of the inductor and capacitor in accordance with a known formula, the circuit resonates.

Figure 1:
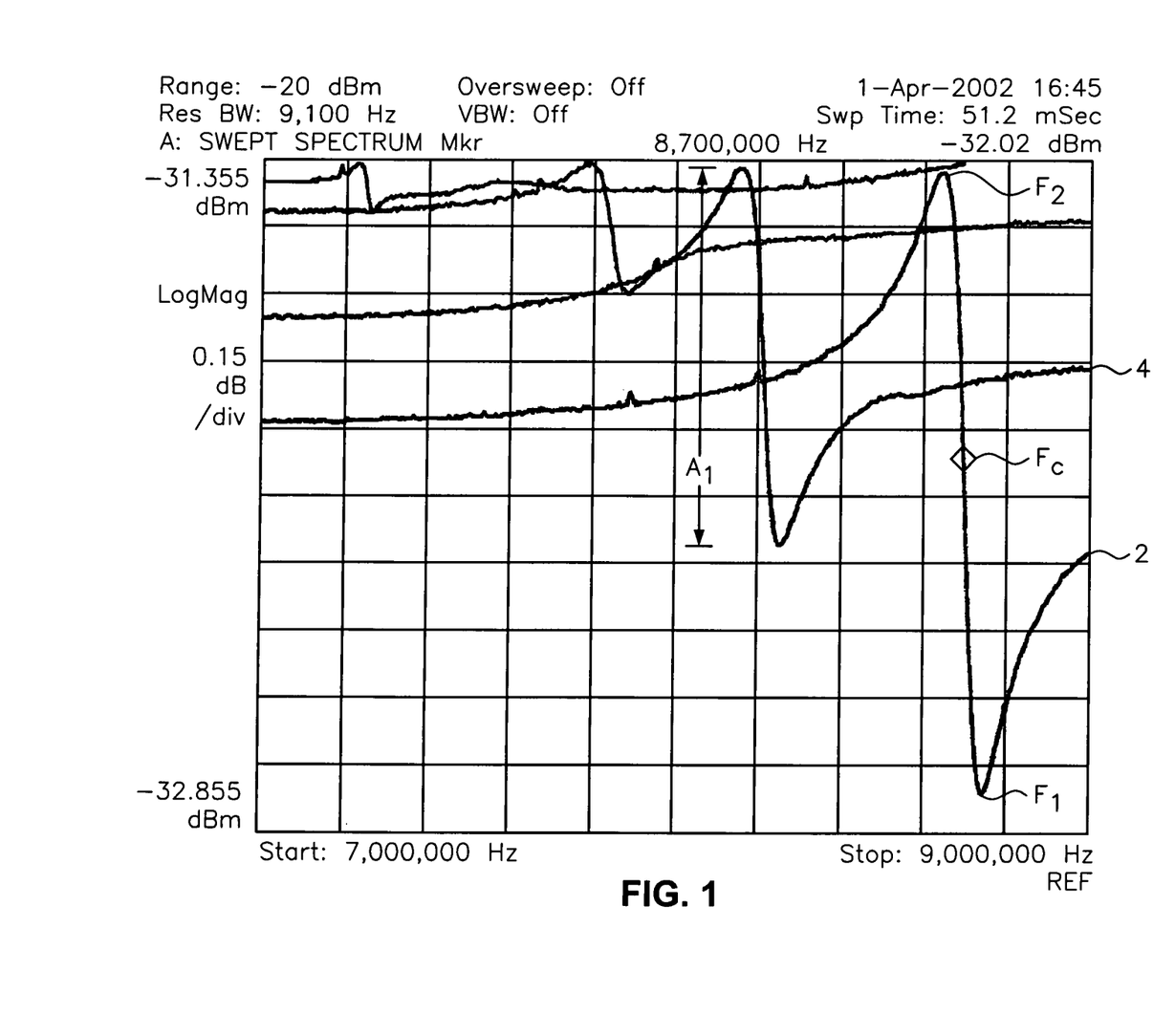
FIG. 1 is a graph showing a trace of the output response signal of a typical LC resonant tag.

FIG. 1 shows four typical output signals resulting from the resonance of four respective typical LC tag circuits. A first one of the output signals 2 shown in FIG. 1 is marked to show the center frequency (Fc), the upper frequency ($F_1$) and the lower frequency ($F_2$) of the respective LC tag having the output signal. Of course, the difference between the upper frequency and the lower frequency establishes the bandwidth. A second one of the output signals 4 shown in FIG. 1 is also marked to show the amplitude ($A_1$) of the respective output signal from the tag described above.

The present invention seeks to improve the performance of a typical LC resonant circuit. In particular, the present invention is aimed at enhancing or amplifying the output signal amplitude response from an LC resonant circuit.

SUMMARY OF THE INVENTION

The preferred embodiment includes a combination of a LC resonant frequency circuit with an adjacent amplification shield. In one preferred embodiment, a resonant LC circuit device includes a resonant frequency circuit having an inductor electrically coupled to a capacitor. The resonant frequency circuit has a center frequency and is arranged to resonate in response to exposure to electromagnetic energy at or near the center frequency, providing an output signal having an amplitude. The amplification shield directs a portion of the electromagnetic energy to the resonant frequency circuit to amplify the amplitude of the output signal from the resonant frequency circuit.

In another preferred embodiment, a resonant LC circuit device includes a passive response member that resonates an output signal having an amplitude in response to exposure of the passive response member to electromagnetic energy at or near a desired frequency. The LC circuit also includes a passive amplification member that directs a portion of the electromagnetic energy to the passive response member to amplify the amplitude of the output signal.

Yet another preferred embodiment includes a method for passively amplifying a response output signal from a LC circuit device. The method includes resonating an output signal having an amplitude from the resonant LC circuit device in response to exposure of the resonant LC circuit device to electromagnetic energy at or near a desired frequency, and directing a portion of the electromagnetic energy to the resonant LC circuit device to amplify the amplitude of the output signal.

Further scope of applicability of the present invention will become apparent in the description given hereinafter. However, it should be understood that the detailed description and specific examples, while indicating preferred embodiments of the invention, are given by way of illustration only, since the invention will become apparent to those skilled in the art from this detailed description.

BRIEF DESCRIPTION OF THE DRAWINGS

The following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. Accordingly, the invention will be described in conjunction with the following drawings, in which like-referenced numerals designate like elements, and wherein.

DETAILED DESCRIPTION OF THE INVENTION

The preferred embodiment includes a combination of a LC resonant frequency circuit with an adjacent amplification shield. In the embodiments illustrated and described below, the LC resonant frequency circuit is in the form of an EAS tag of a type well known to those of ordinary skill in the art and described briefly above. It should be appreciated that the present invention is not limited to use in conjunction with an existing EAS tag. That is, the present invention is also useful in other applications, including chip based RFID applications, chipless RFID applications and other applications which are known or will become known to those of ordinary skill in the art. Accordingly, it should be clearly understood that while the following illustrations are directed to the use of an amplification shield in connection with either EAS or RFID LC resonant frequency tags, the examples are only for the purpose of illustrating the inventive concepts and the invention is not limited to the use of an amplification shield with such tags.

As stated above, the preferred embodiment includes a combination of an LC resonant frequency circuit and an amplification shield. While not being limited to a particular theory, in the illustrated examples the amplification shields are generally planar and are made of a metal or metallic material, such as steel, aluminum, or the like. There are several benefits regarding the methods and mechanisms that are in play with the shield that result in an increased circuit amplification. One benefit is that the shield absorbs at least some of the magnetic field and magnetically couples the absorbed energy to the resonant LC circuit to increase the circuit amplitude or energy available for resonance. Another benefit is that the shield reflects/refracts at least some of the energy from the magnetic field and redirects the energy field toward the LC circuit. A third benefit incorporates the combination of both the absorption and reflection/refraction of the magnetic field to couple added energy to the LC circuit and likewise increase the signal amplitude of the circuit. The presence of an amplification shield with an LC circuit increases the circuit's measured signal amplitude and likewise results in an improved detection or read distance of the LC circuit.

In some of the illustrated embodiments, the area of the amplification shield is substantially greater than the overall dimensions of the LC resonant frequency circuit or tag. However, in other embodiments (FIG. 6 for example) the amplification shield is actually smaller than the overall dimensions of the LC resonant frequency circuit. It will be appreciated by those of ordinary skill in the art that the amplification shield could be made of a conductive material or partially conductive material other than the materials described above. It will also be appreciated by those of ordinary skill in the art that while the present embodiments of the amplification shield are all generally planar, the amplification shield could take on a different shape, if desired. Finally, it should be appreciated by those of ordinary skill in the art that the thickness of the amplification shield may vary from application to application depending upon the parameters and use of the LC resonant frequency circuit.

While not being limited to a particular theory, preferably, and as illustrated by the embodiments described below, the amplification shield is located adjacent to the LC resonant frequency circuit and is preferably in the same (or substantially the same) plane as the LC resonant frequency circuit, or is in a close, generally parallel plane to the circuit. It will be appreciated by those of ordinary skill in the art that the amplification shield may be spaced from the LC resonant frequency circuit, if desired, and may be in a different plane (FIG. 7 for example), if desired. The LC resonant frequency circuit could overlap all or a portion of the amplification shield but if there is an overlap it is preferably only a slight overlap. The LC resonant frequency circuit could be spaced from the amplification shield by preferably the spacing is small. While not being limited to a particular theory, both the LC resonant frequency circuit and the amplification shield are passive, in that they are not required to be a source of energy but are responsive to energy in an electromagnetic field.

Figure 2:
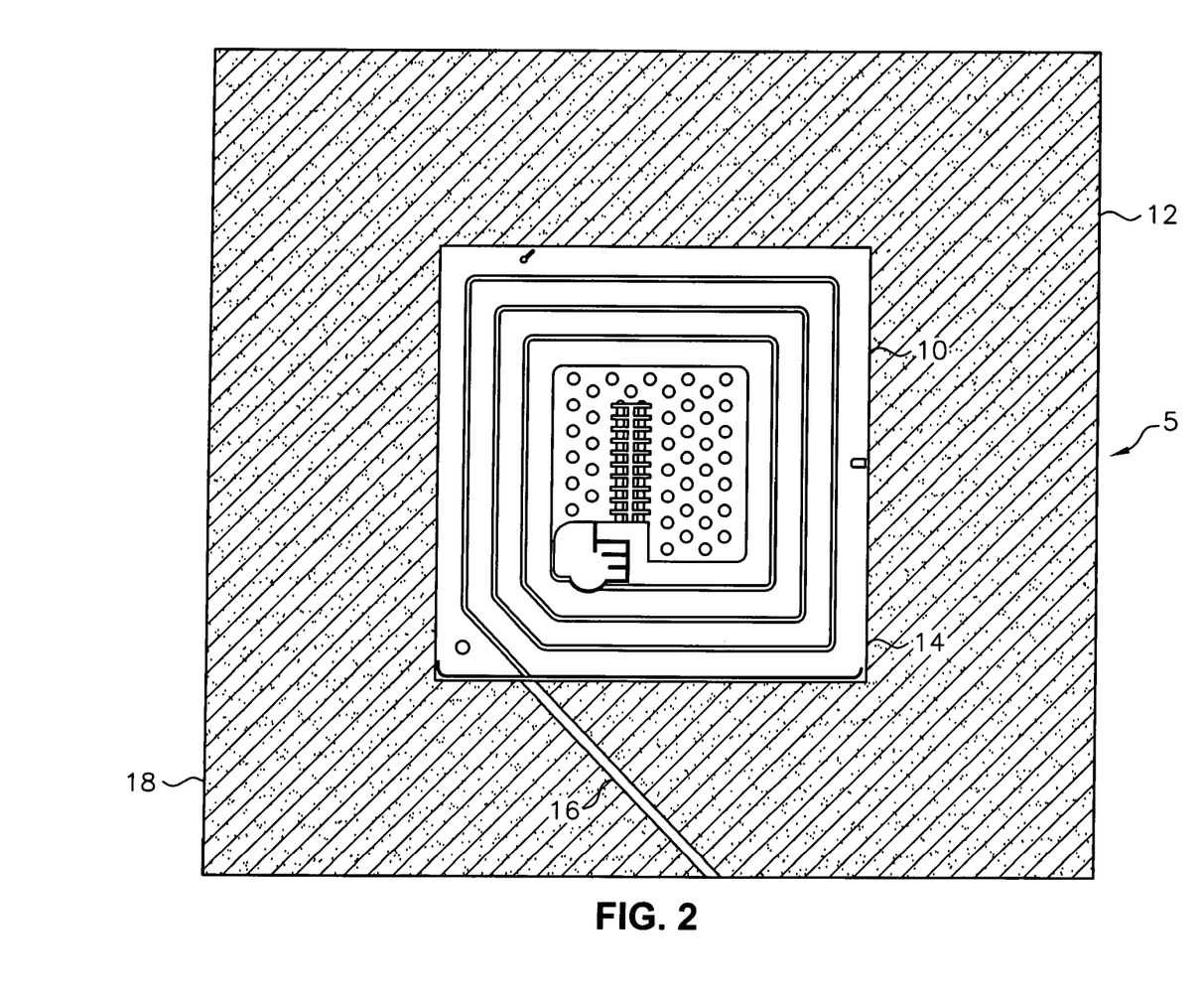
FIG. 2 is a top plan view of a tag which is engaged with an amplification shield in accordance with a first exemplary embodiment of the present invention.

FIG. 2, illustrates a first example of a preferred embodiment of a LC resonant frequency circuit 5 in the form of an exemplary LC resonant tag 10 and a surrounding amplification shield 12. While not being limited to a particular theory, the amplification shield 12 is comprised of a planar layer of metal foil with a thickness of about 38 microns and is generally in the configuration of a square. While the thickness of about 38 microns is a preferred thickness, the thickness of the amplification shield may vary within the scope of the invention. For example, a thinner shield may be preferable for lower costs, while a thicker shield may be preferable for structural integrity. The shield 12 includes a center portion 14 having an aperture of a size which approximates the dimensions of the tag 10. The center portion 14 has been removed from the amplification shield 12 to provide an open area within which the tag 10 is inserted. In this manner, the tag 10 is in the same or substantially the same plane as the plane of the amplification shield 12 with the amplification shield surrounding the tag on all sides.

Still referring to FIG. 2, the tag 10 and amplification shield 12 are electromagnetically coupled, as the tag and shield preferably are not in physical contact, but are substantially in the same plane. Electrical current flows through and around the amplification shield 12, and couples magnetically with the tag 10 via a coil or capacitor of the tag. Preferably, the amplification shield 12 includes a break or slotted groove 16, which extends between the cutout center portion 14 and an outer edge 18 of the amplification shield. The groove 16 provides an open loop to eliminate inductive short-circuiting of the coil portion of the tag 10. In the illustrated embodiment shown in FIG. 2, the tag 10 is generally square, preferably with sides of approximately four inches and the amplification shield 12 is generally square with sides of about 8 inches with the open center portion 14 being square and about four inches. It will be appreciated by those of ordinary skill in the art that while it is preferable to have a shield 12 with dimensions that are greater than that of the tag 10, the specific dimensions employed in connection with the illustrated embodiment are not meant to be limiting.

Figure 3:
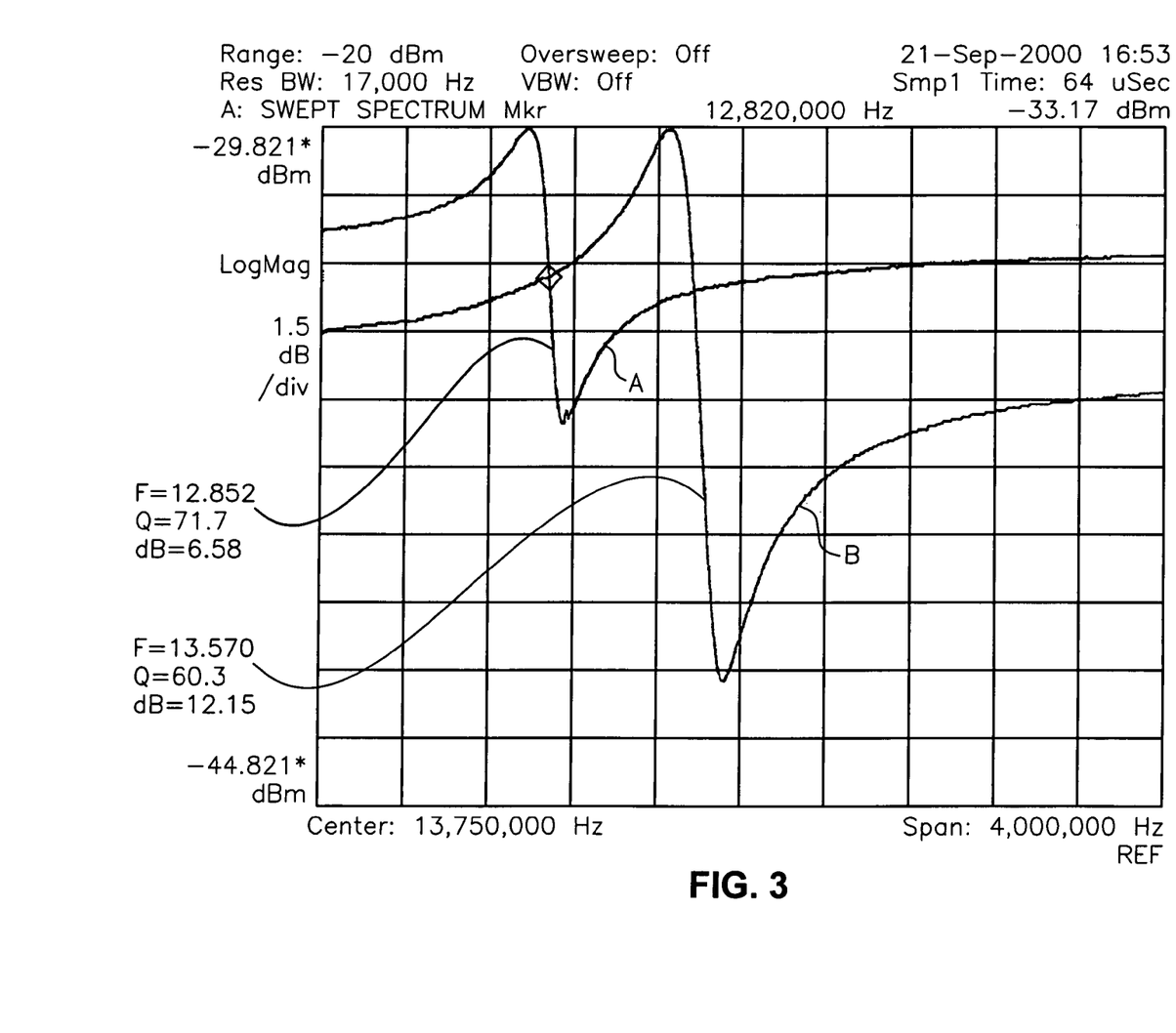
FIG. 3 is a graph showing traces of the output response signals of the tag of FIG. 2 with and without the amplification shield.

FIG. 3 shows the output characteristics or traces of the response signals from the tag 10 of FIG. 2 both with and without the amplification shield 12. The trace labeled "A" shows the output signal of the tag 10 without the amplification shield 12, in which the tag 10 has a center frequency of approximately 12.852 MHz, a quality factor of 71.7 and a signal amplitude of 6.85 dB. The trace labeled "B" illustrates the output characteristics of the same tag 10 but with the amplification shield 12 attached, as shown, for example, in FIG. 2. As can be seen from Trace B of FIG. 3, the center frequency is shifted upwardly to 13.57 MHz, the quality factor is slightly diminished to 60.3, but the signal amplitude has nearly doubled to 12.15 dB.

Figure 4A:
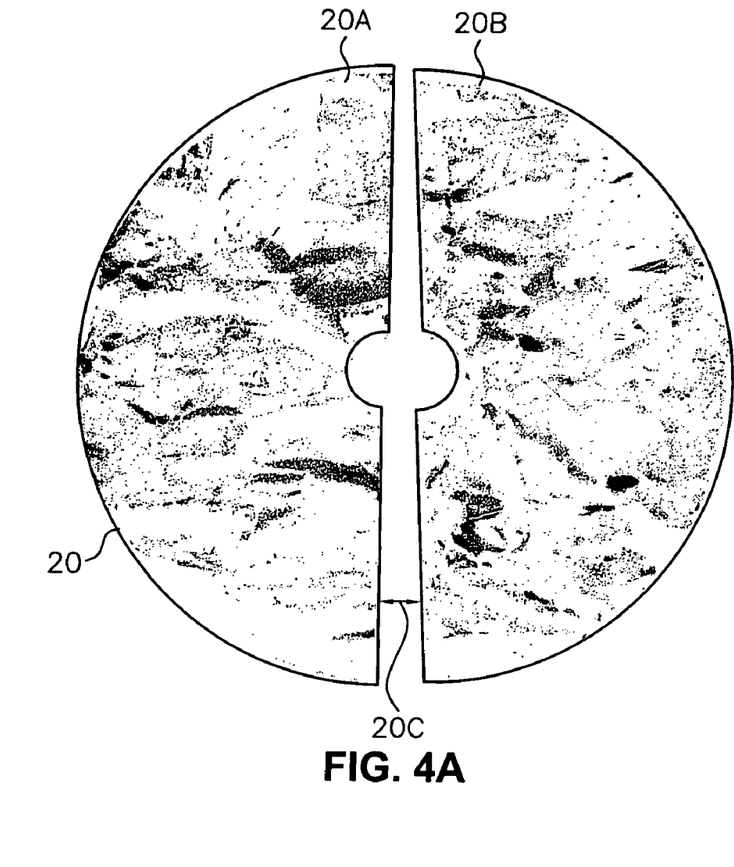
FIGS. 4A and 4B are examples of alternate embodiments of an amplification shield which may be used with a tag in a CD package to enhance tag performance.
Figure 4B:
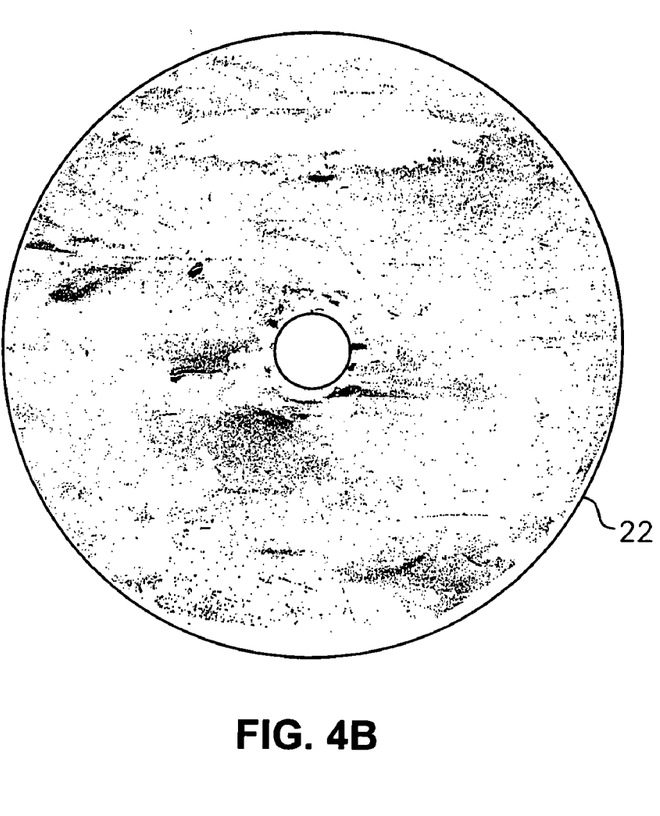

FIGS. 4A and 4B illustrate more examples of the preferred embodiment in the form of two slightly different amplification shields 20, 22. The amplification shields 20, 22 may preferably be used in conjunction with a DVD or CD package. In the embodiment illustrated in FIG. 4A, the amplification shield 20 is a splint shield comprised of two generally semicircular shaped components 20A and 20B which are spaced apart by a slight distance 20C. In the embodiment illustrated in FIG. 4B, the amplification shield 22 is generally circular and continuous. While not specifically shown in FIG. 4B, the amplification shield 22 may also include a break or slot as exemplified by the slotted groove 16 described above during the discussion of FIG. 2. Both amplification shields 20, 22 are adapted to fit within a standard CD "jewel case" package or similar package employed for a CD, DVD or the like.

Although not illustrated in FIGS. 4A and 4B, a tag 10 can be positioned within the standard CD "jewel case" package, either adjacent to or slightly overlapping either of the amplification shields 20, 22. In the illustrated embodiment, the amplification shields 20, 22 are formed of a thin layer of aluminum foil. However, other conductive materials could alternatively be employed. In the illustrated embodiment, the amplification shields 20, 22 have a thickness in the range of about 1–100 microns. However, other thicknesses may alternatively be employed.

Figure 5:
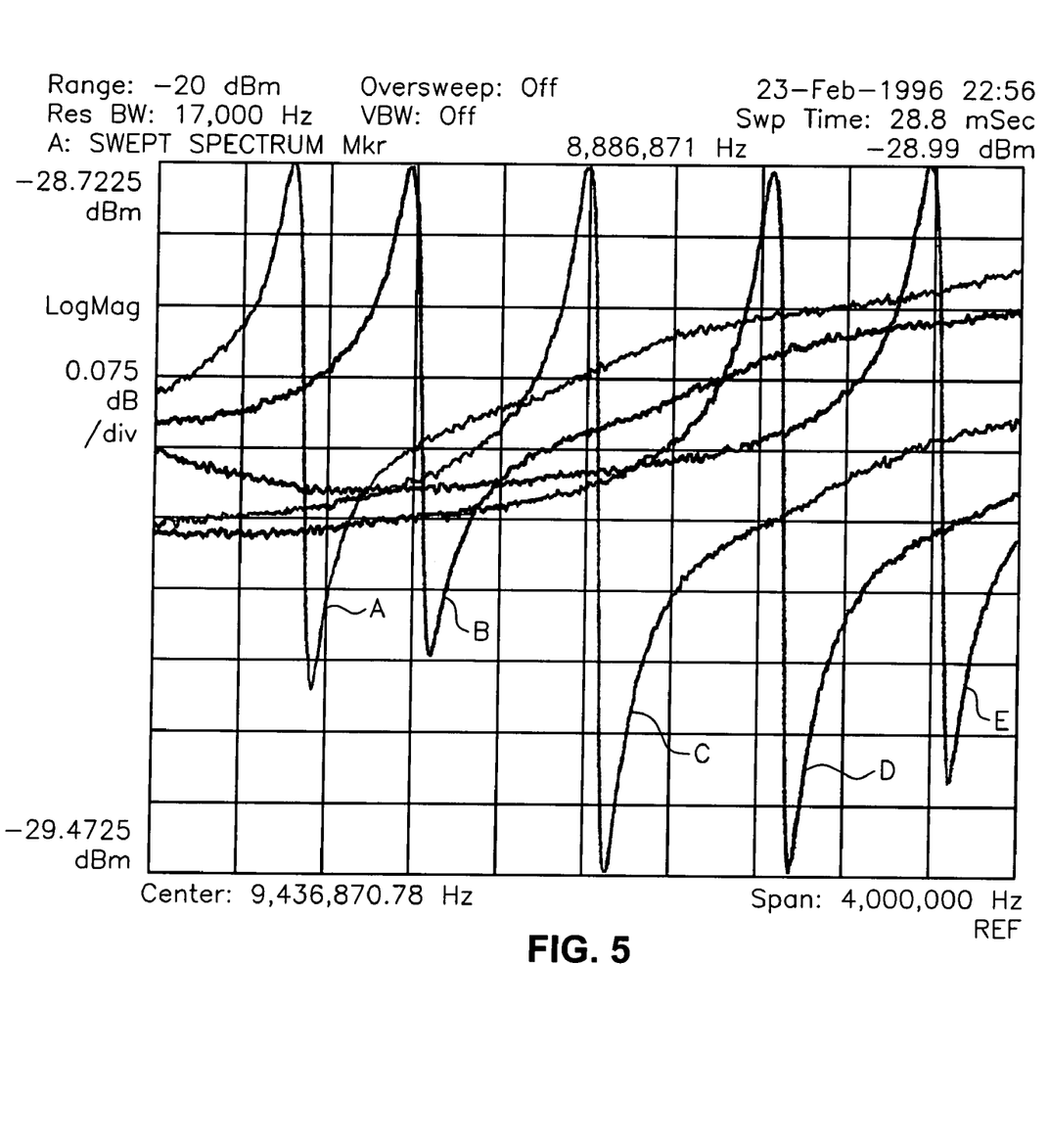
FIG. 5 is a graph showing traces of the output response signals of a tag with and without the amplification shields of FIGS. 4A and 4B.

FIG. 5 illustrates the response of the tag 10 with and without an amplification shield as described in greater detail below. Trace A of FIG. 5 shows the output response of the tag 10 by itself. Trace B of FIG. 5 shows the output response of the tag 10 when placed in a CD "jewel case" package without an amplification shield. Trace C of FIG. 5 shows the output response of the same tag 10 in the CD package but with the amplification shield 22 of FIG. 4B placed within the CD package so that the tag at least partially overlaps the amplification shield. Trace D of FIG. 5 illustrates the output response of the split amplification shield 20 of FIG. 4A with the same tag 10 that is used for Traces A–C and similarly placed within the CD package. As can be seen from a comparison of Trace B with Traces C and D, the use of either of the amplification shields 20, 22 results in a significant increase in amplitude from approximately 0.525 dB to approximately 0.750 dB for amplitude gain of about 43%. Trace E of FIG. 5 illustrates the output response of the tag 10 with component 20A, which is one half of the amplification shield 20 of FIG. 4A. Trace E shows an output response amplitude gain over the output response amplitude of the tag 10 used without a shield (Trace B).

Figure 6:
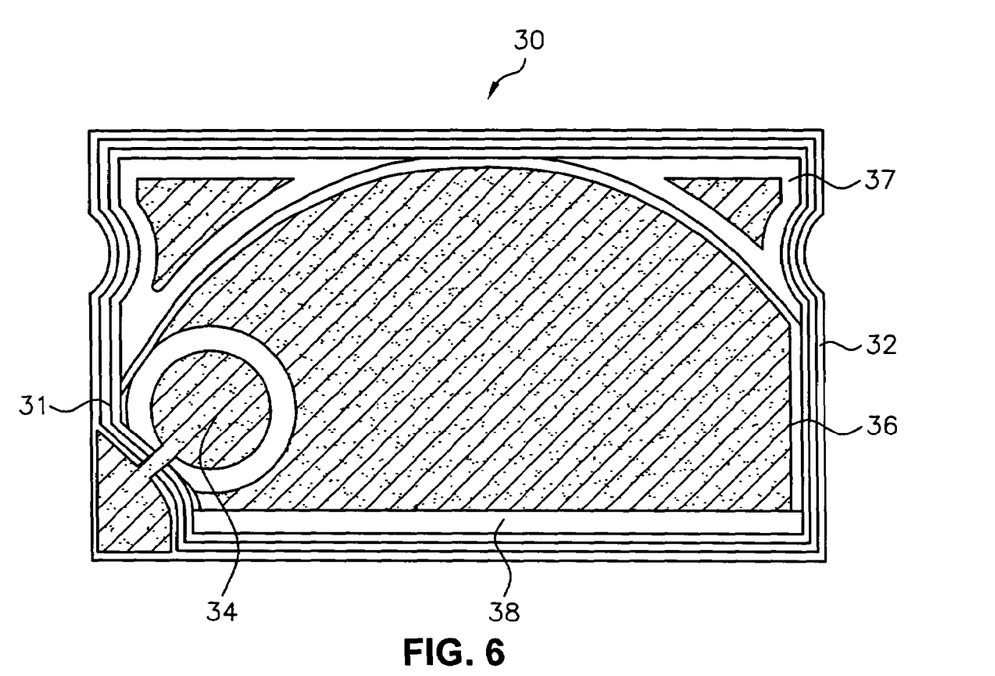
FIG. 6 illustrates a further exemplary embodiment of an amplification shield used in connection with a tag of the type employed in a CD jewel box.

FIG. 6 illustrates another example of the preferred embodiment as a generally rectangular tag 30 having a resonant circuit 31 and a generally arcuate amplification shield 36. The resonant circuit 31 includes a first electrical member formed as an inductor coil 32 and a second electrical member formed as a capacitor 34 having two conducting plates, with one of the plates coupled to the inductor coil. The amplification shield 36 is positioned within the generally open central area 38 of the tag 30, such that the amplification shield 36 is in the same or substantially the same plane as the tag 30. The resonant circuit 31 and amplification shield 36 are attached to a substrate 37, preferably by bonding with an adhesive or heat. The bonding holds the resonant circuit 31 and amplification shield 36 in a spatial relationship as configured. While not being limited to a particular theory, the amplification shield 36 is connected to one of the conduction plates of the capacitor 34. A tag 30 with an amplification shield 36 as shown in FIG. 6 also exhibits enhanced output response signal amplitude.

Figure 7:
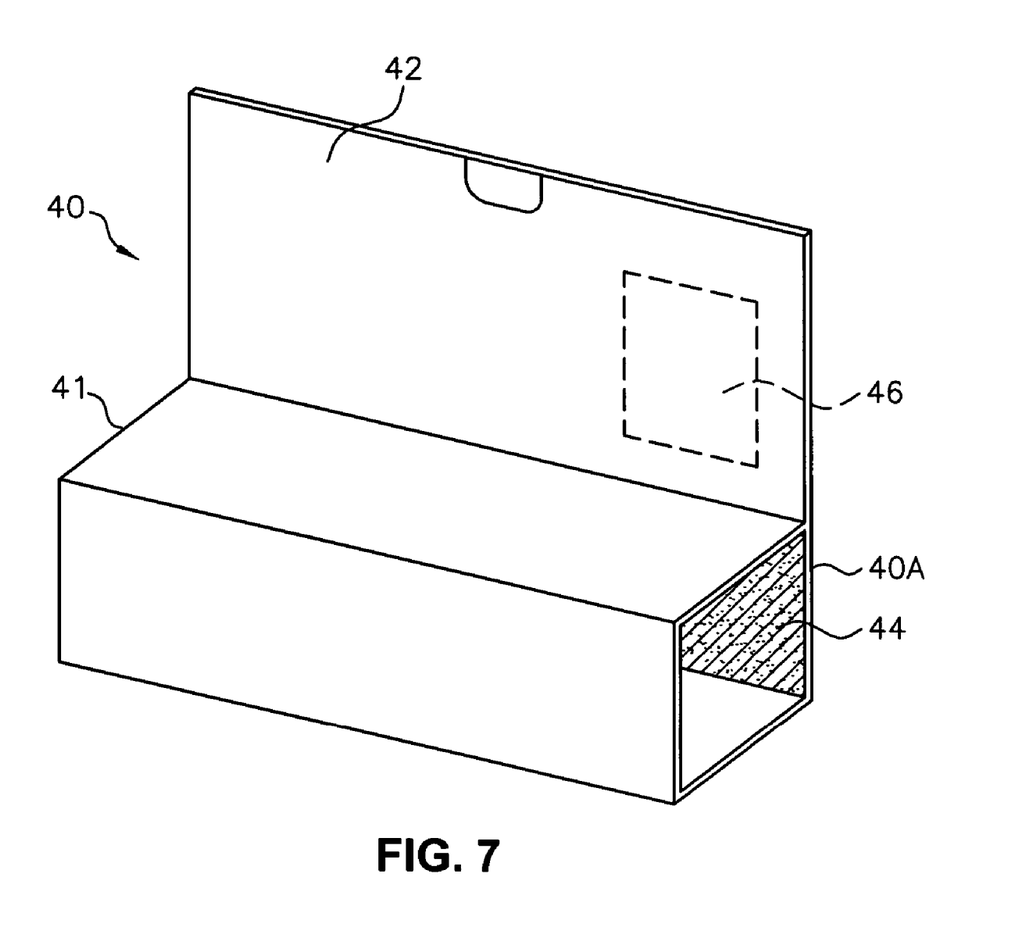
FIG. 7 is a diagrammatic illustration of a further embodiment of the present invention which incorporates an amplification shield within product packaging.

FIG. 7 shows a container 40 having a parallelepiped shaped box 41 and a display panel 42 outwardly extending from a back wall 40A of the box 41. The display panel 42 is typically employed for advertising and display purposes. In the exemplary embodiment illustrated in FIG. 7, the container 40 includes a generally rectangular amplification shield 44 positioned along the back wall 40A of the container 40 and a tag 46 positioned either in or on an outwardly extending display panel 42. Preferably the amplification shield 44 is located along an interior side of the entire back wall 40A for protection, and the tag 46 is located so that the tag and the amplification shield are generally aligned in substantially the same plane and adjacent to but slightly spaced from each other. While not being limited to a particular theory, the amplification shield 44 is preferably attached to the back wall 40A via an adhesive or heat bonding, and the tag 46 is attached to the display panel 42 via an adhesive or held in place between layers of the panel, as readily understood by a skilled artesan.

Figure 8:
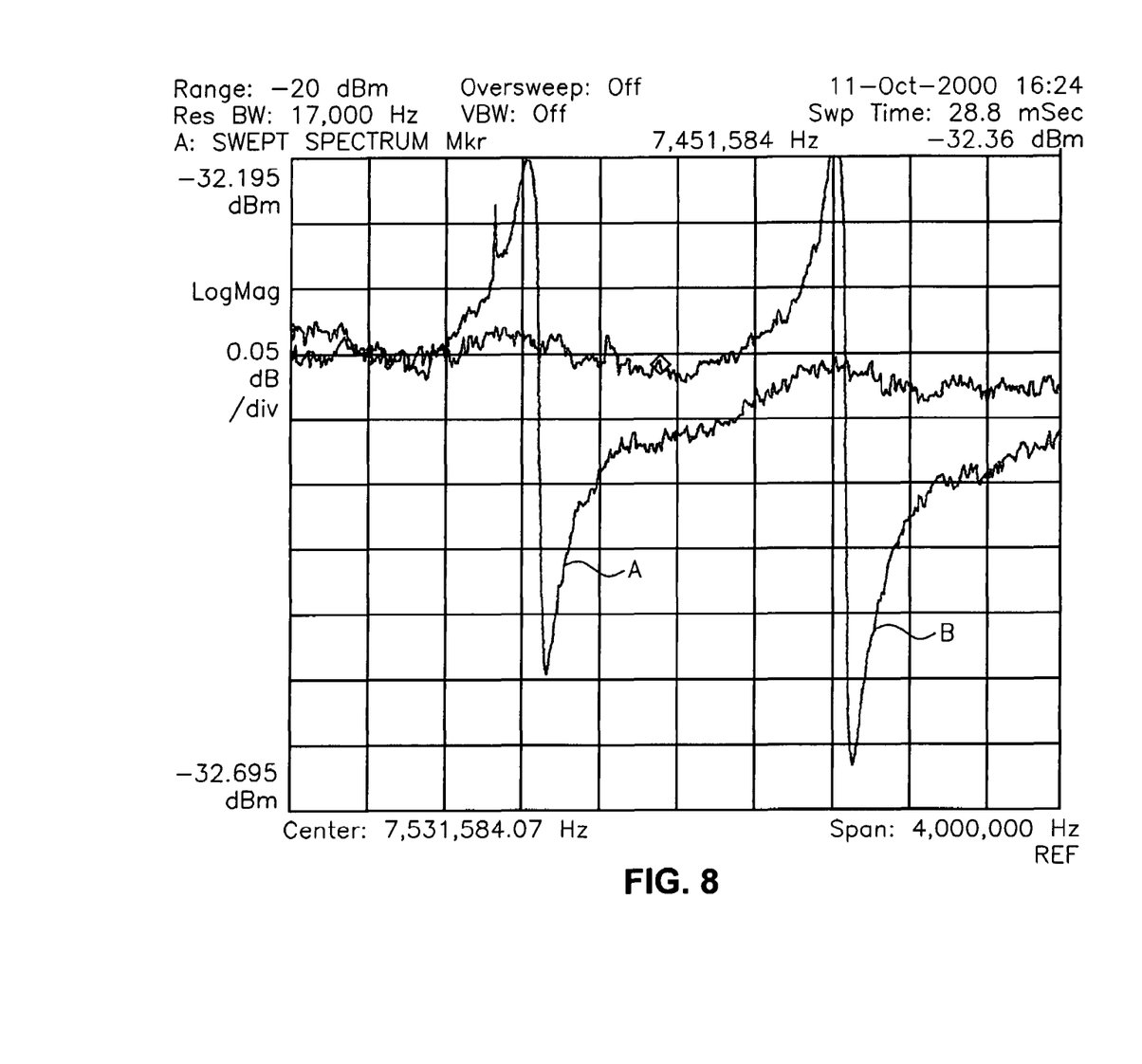
FIG. 8 is a graph showing traces of the output response signals of the tag of FIG. 7 both with and without the amplification shield.

FIG. 8 illustrates the performance of the tag 46 of FIG. 7, both without the amplification shield 44 (trace A) and with the amplification shield 44 (trace B). As can be seen, the use of the amplification shield 44 increases the response output signal amplitude from the tag 46 from about 0.4 dB to about 0.48 dB for an amplitude gain of about 20%. It is understood that the amplitude could be even further increased by minimizing the spacing between the tag 46 and the amplification shield 44.

As can be seen from the foregoing discussion and examples, the use of an amplification shield provides significant improvement in the output signal amplitude of a LC resonant frequency circuit. Thus, an amplification shield can be employed for applications in which a higher output signal amplitude is desired without the need for increasing the size of the resonant frequency circuit. The application of such an amplification shield is much more efficient and cost effective than developing and producing a larger resonant frequency circuit or tag. The use of amplification shields also provide greater flexibility for meeting an array of resonant frequency circuit applications with the same basic circuit design and construction but with amplification shields of differing sizes, shapes or configurations.

From the foregoing it can be that the present invention comprises an improved LC resonant frequency circuit which includes an amplification shield for enhancing output signal amplitude. It will be appreciated by those of ordinary skill in the art that changes or modifications could be made to the various embodiments described above. For example, the embodiment exemplified in FIG. 6 could be modified with the capacitor 34 positioned outside the inductor coil 32, and one plate of the coil extended to form an amplification shield. It should be understood, therefore, that the present invention is not limited to the particular described embodiments, but instead, is meant to encompass all modifications within the spirit and scope of the disclosed inventive concept.

What is claimed is:

1. A resonant LC circuit device, comprising:
   a resonant frequency circuit including an inductor electrically coupled to a capacitor, said resonant frequency circuit having a center frequency and arranged to resonate in response to exposure to electromagnetic energy at or near the center frequency, providing an output signal having an amplitude; and
   an amplification shield adjacent said resonant frequency circuit, said amplification shield arranged to direct a portion of the electromagnetic energy to said resonant frequency circuit to amplify the amplitude of the output signal from the resonant frequency circuit, said amplification shield including an outer edge, a center portion having an aperture adjacent said resonant frequency circuit, and a slotted grove extending from said aperture to said outer edge to provide an open loop eliminating inductive short-circuiting of said inductor of said resonant frequency circuit.

2. The resonant LC circuit device of claim 1, wherein said amplification shield is passive.

3. The resonant LC circuit device of claim 1, wherein said amplification shield is substantially planar and metallic.

4. The resonant LC circuit device of claim 1, wherein said resonant frequency circuit includes a dielectric substrate having first and second surfaces on opposite sides thereof, said inductor including a conductive pattern on said first surface, said capacitor including first and second electrodes, said first electrode having a first conductive plate on said first surface coupled to said first conductive pattern, said second electrode having a second conductive plate on said second surface, said resonant frequency circuit further including a conductive trace electronically coupling said second conductive plate and said first conductive pattern.

5. The resonant LC circuit device of claim 4, wherein said amplification shield extends from one of said first conductive plate and said second conductive plate.

6. The resonant LC circuit device of claim 1, wherein said amplification shield is substantially larger in area than said resonant frequency tag.

7. The resonant LC circuit device of claim 6, wherein said amplification shield surrounds and is substantially coplanar with said resonant frequency tag.

8. The resonant LC circuit device of claim 1, wherein said amplification shield is substantially planar and has a generally polygon-shaped configuration.

9. The resonant LC circuit device of claim 1, wherein said amplification shield is substantially planar and has a generally circular shaped configuration.

10. The resonant LC circuit device of claim 1, wherein said amplification shield is substantially planar and includes two generally semicircular shaped metallic portions spaced apart to form a generally circular shaped configuration.

11. The resonant LC circuit device of claim 1, wherein said resonant frequency circuit located adjacent said aperture is capable of overlapping said amplification shield.

12. The resonant LC circuit device of claim 11, wherein said resonant frequency circuit overlaps said amplification shield.

13. A resonant LC circuit device, comprising:
    a resonant frequency circuit including an inductor electrically coupled to a capacitor, said resonant frequency circuit having a center frequency and arranged to resonate in response to exposure to electromagnetic energy at or near the center frequency, providing an output signal having an amplitude; and
    an amplification shield adjacent said resonant frequency circuit, said amplification shield arranged to direct a portion of the electromagnetic energy to said resonant frequency circuit to amplify the amplitude of the output signal from the resonant frequency circuit, wherein said amplification shield is located within said inductor.

14. The resonant LC circuit device of claim 1, including a central portion, said resonant frequency circuit being formed outside of said central portion, said amplification shield being positioned within said central portion so that said amplification shield is spaced apart from said resonant frequency circuit to amplify the amplitude of the output signal from the resonant frequency circuit.

15. The resonant LC circuit device of claim 14, wherein said amplification shield is generally coplanar to said resonant frequency circuit.

16. The resonant LC circuit device of claim 1, wherein said amplification shield is connected to said capacitor.

17. A resonant LC circuit device, comprising:
    passive response means to resonate an output signal having an amplitude in response to exposure of said passive response means to electromagnetic energy at or near a desired frequency, said passive response means including a resonant frequency circuit; and
    passive amplification means to direct a portion of the electromagnetic energy to said passive response means to amplify the amplitude of the output signal, said passive amplification means including an amplification shield having an outer edge, a center portion having an aperture adjacent said resonant frequency circuit, and a slotted groove extending from said aperture to said outer edge to provide an open loop eliminating short-circuiting of said resonant frequency circuit.

18. A method for passively amplifying a response output signal from a resonant LC circuit device, comprising:
    providing a resonant frequency circuit including an inductor electrically coupled to a capacitor, said resonant frequency circuit having a desired frequency;
    providing an amplification shield adjacent said resonant frequency circuit, said amplification shield including an outer edge, a center portion having an aperture adjacent said resonant frequency circuit, and a slotted grove extending from said aperture to said outer edge to provide an open loop eliminating inductive short-circuiting of said inductor of said resonant frequency circuit and form the resonant LC circuit device;
    resonating an output signal having an amplitude from the resonant LC circuit device in response to exposure of the resonant frequency circuit to electromagnetic energy at or near the desired frequency; and
    directing a portion of the electromagnetic energy to the resonant frequency circuit to amplify the amplitude of the output signal.

19. The resonant LC circuit device of claim 17, wherein said resonant frequency circuit adjacent said aperture is capable of overlapping said amplification shield.

20. The resonant LC circuit device of claim 17, wherein said amplification shield extends substantially along a first plane, said resonant frequency circuit extends substantially along a second plane, and said amplification shield is substantially larger in said first plane than said resonant frequency circuit in said second plane.

21. The method of claim 18, further comprising overlapping the resonant frequency circuit over the amplification shield.

22. The method of claim 18, wherein the step of providing the amplification shield includes providing the amplification shield substantially larger than the resonant frequency circuit.

* * * * *